Nov. 11, 1958 — G. HAIGHT — 2,859,887
LOAD HANDLING ATTACHMENT FOR AUTOMOBILES
Filed Nov. 4, 1955 — 2 Sheets-Sheet 2
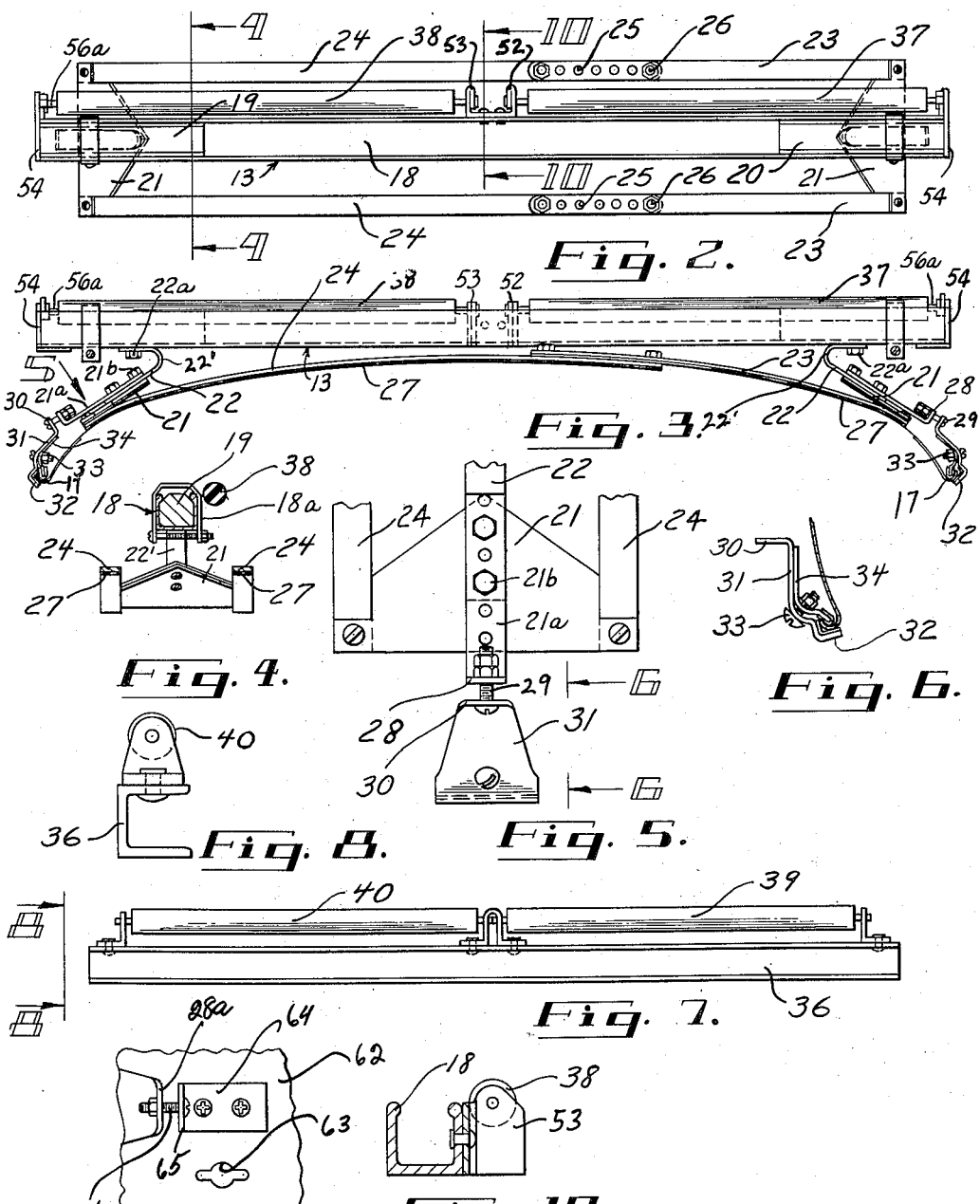
INVENTOR.
GALEN HAIGHT United States Patent Office 2,859,887
Patented Nov. 11, 1958

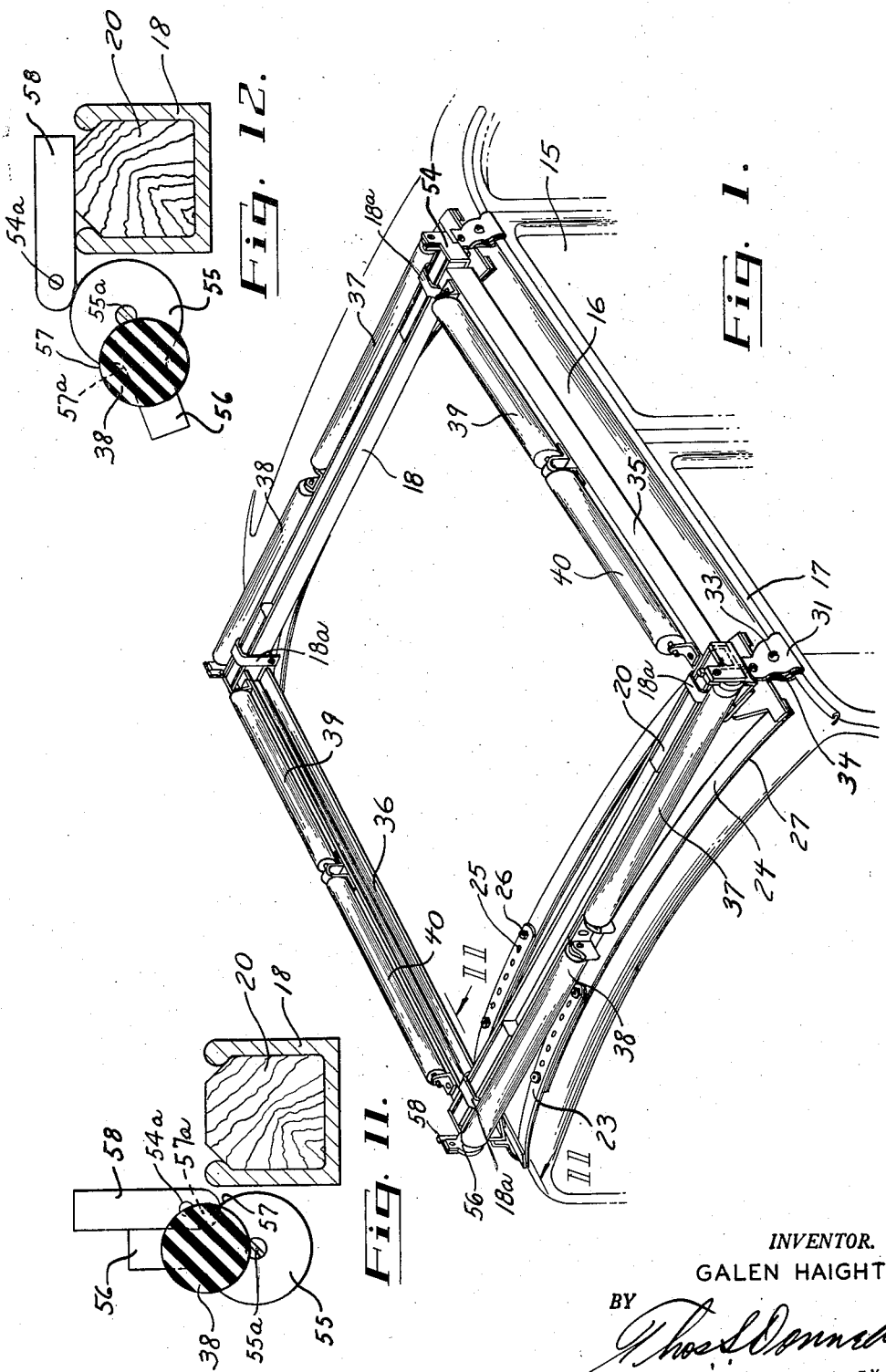

2,859,887

LOAD HANDLING ATTACHMENT FOR AUTOMOBILES

Galen Haight, Detroit, Mich.

Application November 4, 1955, Serial No. 546,924

6 Claims. (Cl. 214—450)

My invention relates to a new and useful improvement in a load handling attachment for automobiles adapted for being mounted on the top of a vehicle and serving as a support for objects placed thereon. In such load handling attachments it is desirable that the load be spaced from the roof of the vehicle body so as to prevent marring or damaging of the same. In some of these attachment mechanisms the attachment means has a position which lies directly in contact with the roof of the vehicle so that the attachment member itself may cause a marring or scratching of the roof of the vehicle.

It is an object of the present invention to provide an attachment of this class which will be simple of structure, economical of manufacture, durable, light, compact, highly efficient in use and easily attached and detached from the vehicle body.

Another object of the invention is the provision of an attachment of this class whereby the attachment mechanism is held in spaced relation from the roof of the body.

Another object of the invention is the provision of an attachment having a resilient supporting member which is attached to the sides of the vehicle body and spans the top thereof and serves to hold a load supporting frame from the top of the body.

Other objects will appear hereinafter.

It is recognized that various modifications and changes may be made in the details of the structure illustrated without departing from the invention, and, it is intended that the present disclosure shall be considered to be but the preferred embodiment.

Forming a part of this application are drawings in which:

Fig. 1 is a semi-schematic view showing the invention applied;

Fig. 2 is a top plan view of the invention;

Fig. 3 is an end elevational view of the invention;

Fig. 4 is a sectional view taken on line 4—4 of Fig. 2;

Fig. 5 is an enlarged elevational view of a part taken as indiacted by the arrow 5;

Fig. 6 is a side elevational view of a part shown in Fig. 5 and indicated by the arrow 6;

Fig. 7 is a side elevational view of a part of the invention;

Fig. 8 is an end elevational view of the part shown in Fig. 7;

Fig. 9 is a plan view of a modification of an attachment;

Fig. 10 is a sectional view taken on line 10—10 of Fig. 2;

Fig. 11 is an enlarged sectional view taken on line 11—11 of Fig. 1;

Fig. 12 is a sectional view similar to Fig. 11 showing the roller in lowered position.

In the drawings I have indicated a vehicle body 15 having a roof or top 16. Extending longitudinally of this body at each side of the top is a drip molding 17 which is sufficiently spaced from the vehicle top to permit a clamping mechanism to engage therewith.

In Fig. 1, I have shown a pair of load supporting units and from the description it will appear obvious that more than a pair of units may be used if desired. Each of these units includes a supporting member generally designated by the numeral 13 which comprises a trough-shaped member or bar 18 positioned in which at opposite ends thereof is slidably mounted a bar 19 and a bar 20 (Fig. 2) so that the overall length of the supporting member 13 thus formed may be adjusted. It will be obvious, that when the bars 19 and 20 are moved outwardly of the trough-shaped member 18, the overall length of the supporting member 13 will be increased. Figs. 2 and 3 show the bars 19 and 20 in their inwardly adjusted position wherein they do not extend beyond the ends of member 18. A rigid plate 21 is attached to the outer end of a resilient spring arm 22 which has an angularly turned inner end portion 22' which is attached to the central supporting bar 18 by means of the bolts 22a. One of these rigid plates 21 is located at each end of the trough-shaped bar 18, as clearly shown in Fig. 2 and Fig. 3. Attached to one of these rigid plates 21 is the outer end of each of a pair of resilient spring bars 23, and attached at their outer ends to the other rigid plate 21 is a pair of resilient spring bars 24. The corresponding spring bars 23 and 24 overlap at their inner free ends and are provided with openings 25 through which bolts 26 may be passed so that the overall length of these connected spring bars may be adjusted. The lower face of each of these spring bars 23 and 24 is covered with a layer 27 of yieldable material, such as rubber or the like. As shown in Figs. 3 and 5, the outer ends of each of the spring arms 22 rest on the upper face of one of the rigid plates 21. A strap 21a rests on the top of the outer end of each of the spring arms 22 and each of the straps 21a is fixed to the adjacent arm 22 and rigid plate 21 by means of the bolts 21b.

Each of the straps 21a is provided with an upstanding lug 28 on the outer end thereof through which is passed a bolt 29 extending through the lug 30 formed on the inner end of the clip 31. This clip 31 has an angularly turned outer end 32 which is adapted to overlie one side of the drip molding 17. Secured to the clip 31 by means of a bolt and nut generally indicated by the numeral 33 is a clamping plate 34 which engages the opposite side of the drip molding 17, so that upon tightening the bolt and nut means 33 the clip 31 and plate 34 are thus securely clamped to the drip molding 17, thus securing the load supporting unit on the drip molding. The spring bars 23 and 24 are so adjusted so that when in clamping relation to the drip molding 17 on opposite sides to the vehicle body 15, a rubber layer 27 on the bottom of the spring bars 23 and 24 will be in engagement with the top surface of the roof 16 of the vehicle body, thus retaining the supporting member 13 in elevated relation to the vehicle body 15. It will be seen that the parts 21a, 30, 31, 33 and 34 co-act to provide a drip molding clamping mechanism.

In Fig. 1, I have shown a pair of these load supporting units in spaced relation to each other. I have also indicated these units connected together by the bars or rigid supports 35 and 36. If desired, these bars 35 and 36 may be dispensed with and the pair of load supporting units may be individually mounted on the vehicle body. In Fig. 1, I have indicated rollers 37 and 38 mounted on each of the supporting members 13, these rollers extending transversely of the vehicle body. These rollers 37 and 38 would be used when it is desired to place the load on the vehicle body from the rear thereof. If desired, to place the load on the vehicle body from the side, the rollers 37 and 38 would be removed and the connecting bars 35 and 36 would be provided with the rollers 39 and 40. When the rollers 39 and 40 are used, the connecting bars 35 and 36 would, of course, have to be present.

It will be noted that in either construction the supporting members 13 or bars 35 and 36 upon which the load rests are held in spaced relation to the top of the vehicle body 15, thus eliminating marring or scratching of, or other damage to, the vehicle body.

It is believed obvious that the construction may be easily and quickly mounted on a vehicle body and removed therefrom.

As shown in Fig. 4 the bars 19 and 20 are held in position in the trough-shaped member 18 by a U-shaped clamp 18a. Upon loosening the clamp 18a, the length of the construction may be adjusted.

As shown clearly in Fig. 2, the rollers 37 and 38 are swively and rotatably mounted at the inner ends thereof in the lugs or brackets 52 and 53 respectively. The opposite ends of these rollers are mounted as described hereinafter.

Mounted on each outer end of the members 19 and 20 is a plate 54 to which is pivotally mounted by means of the pin 55a a disc or bracket 55 having an arm 56 projecting outwardly therefrom and provided with a recess 57a which terminates in the shoulder 57. The rollers 37 and 38 are each rotatably mounted at their outer ends in an arm 56 by means of the shafts 56a so that these rollers are mounted eccentric to the discs 55. When the discs 55 are rotated on their axes 55a the outer ends of the rollers 37 and 38 may be moved to the position shown in Fig. 11, which is the position shown in Fig. 1. In this position the rollers 37 and 38 are positioned above the members 19 and 20. To retain these rollers in this position, a bar 58 is pivotally mounted to each of the plates 54 by means of the pins 54a and when the bars 58 are rocked to the upright operative position shown in Fig. 11, the discs 55 cannot be rotated downwardly to an inoperative position. The discs 55 are prevented from being rotated by means of the lower end of the bars 58 engaging in the recesses 57a whereby the discs 55 cannot be rotated because the shoulders 57 will not clear the lower ends of the bars. However, when the bars 58 are moved to the position shown in Fig. 12, the shoulders 57 will clear the lower ends of the bars 58 and the outer ends of the rollers may be rotated downwardly to the inoperative position shown in Fig. 12 so that the load placed upon the carrier will rest upon the outer edges of the supporting bars 18 instead of upon the rollers, thus securing the load against movement relative to the carrier. The inner ends of the rollers 37 and 38 are swively and rotatably mounted at the points 52 and 53 respectively as was stated hereinbefore so as to permit such swinging movement of the outer ends of the rollers.

In Fig. 9, I have shown a slight modification in which the clamping mechanism clamping over the drip molding is removed. A plate 62 is provided with an opening 63 which fits over a suitable stud projecting over the vehicle body. This plate 62 carries a plate 64 having a lug 65. A bolt 66 is projected through the lug 65 and also the lug 28a corresponding to the angularly turned portion or lug 28 clearly shown in Fig. 2.

What I claim is:

1. A load handling attachment for use with a vehicle having a body provided with a top having a drip molding thereon, comprising: a supporting member extending transversely of said vehicle body in elevated relation thereto; a pair of laterally spaced resilient spring bars extending lengthwise of said supporting member toward the opposite ends thereof; a pair of rigid plates for connecting the adjacent ends of said pair of resilient spring bars together; a resilient spring arm connected to each of said plates and connected to said supporting member adjacent to the opposite ends thereof for retaining said supporting member in spaced relation to the top of the vehicle body; and, a clamping mechanism connected to each of said plates for clamping engagement with the drip molding for retaining said spring bars in engagement with the upper surface of said body top.

2. A load handling attachment for use with a vehicle having a body provided with a top having a drip molding thereon, comprising: a supporting member extending transversely of said vehicle body in elevated relation thereto; a pair of laterally spaced resilient spring bars extending lengthwise of said supporting member toward the opposite ends thereof; a pair of rigid plates for connecting the adjacent ends of said pair of resilient spring bars together; a resilient spring arm connected to each of said plates and connected to said supporting member adjacent to the opposite ends thereof for retaining said supporting member in spaced relation to the top of the vehicle body; a clamping mechanism connected to each of said plates for clamping engagement with the drip molding for retaining said spring bars in engagement with the upper surface of said body top; and, means for adjusting the length of said supporting member.

3. A load handling attachment for use with a vehicle having a body provided with a top having a drip molding thereon, comprising: a supporting member extending transversely of said vehicle body in elevated relation thereto; a pair of laterally spaced resilient spring bars extending lengthwise of said supporting member toward the opposite ends thereof; a pair of rigid plates for connecting the adjacent ends of said pair of resilient spring bars together; a resilient spring arm connected to each of said plates and connected to said supporting member adjacent to the opposite ends thereof for retaining said supporting member in spaced relation to the top of the vehicle body; a clamping mechanism connected to each of said plates for clamping engagement with the drip molding for retaining said spring bars in engagement with the upper surface of said body top; means for adjusting the length of said supporting member; and, means for adjusting the length of said spring bars.

4. A load handling attachment for use with a vehicle having a body provided with a top having a drip molding thereon, comprising: a supporting member extending transversely of said vehicle body in elevated relation thereto; a pair of laterally spaced resilient spring bars extending lengthwise of said supporting member toward the opposite ends thereof; a pair of rigid plates for connecting the adjacent ends of said pair of resilient spring bars together; a resilient spring arm connected to each of said plates and connected to said supporting member adjacent to the opposite ends thereof for retaining said supporting member in spaced relation to the top of the vehicle body; a clamping mechanism connected to each of said plates for clamping engagement with the drip molding for retaining said spring bars in engagement with the upper surface of said body top; a first bracket carried by said supporting member; a second bracket carried by said supporting member in spaced relation to said first bracket; and, a roller pivotally mounted on said brackets and extending between the same, one of said brackets being swingable for moving said roller into and out of operative position.

5. A load handling attachment for use with a vehicle having a body provided with a top having a drip molding thereon, comprising: a supporting member extending transversely of said vehicle body in elevated relation thereto; a pair of laterally spaced resilient spring bars extending lengthwise of said supporting member toward the opposite ends thereof; a pair of rigid plates for connecting the adjacent ends of said pair of resilient spring bars together; a resilient spring arm connected to each of said plates and connected to said supporting member adjacent to the opposite ends thereof for retaining said supporting member in spaced relation to the top of the vehicle body; a clamping mechanism connected to each of said plates for clamping engagement with the drip molding for retaining said spring bars in engagement with the upper surface of said body top; a first bracket carried by said supporting member; a second bracket carried by said supporting member in spaced relation to said first bracket; a roller pivotally mounted on said brackets and extending between the same, one of said brackets being swingable for moving said roller into and out of operative position; and, a swingable bar for engaging said swingable bracket and preventing swinging of the same from operative to inoperative position.

6. A load handling attachment for use with a vehicle having a body with a top having a drip molding thereon, comprising: a pair of laterally spaced load supporting units extending transversely of said body above the top thereof, and each of said units comprising a supporting member extending transversely of said vehicle body in elevated relation thereto; a pair of laterally spaced resilient spring bars extending lengthwise of each of said supporting members toward the opposite ends thereof; a pair of rigid plates for connecting the adjacent ends of each of said pairs of spring bars together; a resilient spring arm connected to each of said rigid plates and connected to one of said supporting members adjacent to an end thereof for retaining said supporting members in spaced relation to the top of the vehicle body; a clamping mechanism connected to each of said plates for clamping engagement with the drip molding for retaining said spring bars in engagement with the upper surface of said body top; and, a pair of spaced apart rigid supports extending lengthwise of the vehicle body for connecting together the corresponding ends of said supporting members.

References Cited in the file of this patent

UNITED STATES PATENTS

| | | |
|---|---|---|
| 1,519,416 | Ogren | Dec. 16, 1924 |
| 1,894,482 | Dorsey | Jan. 17, 1933 |
| 2,469,945 | Brei | May 10, 1949 |
| 2,469,987 | Pilsner | May 10, 1949 |
| 2,639,848 | Burmeister | May 26, 1953 |
| 2,752,079 | Merrill | June 26, 1956 |